Figure 1:
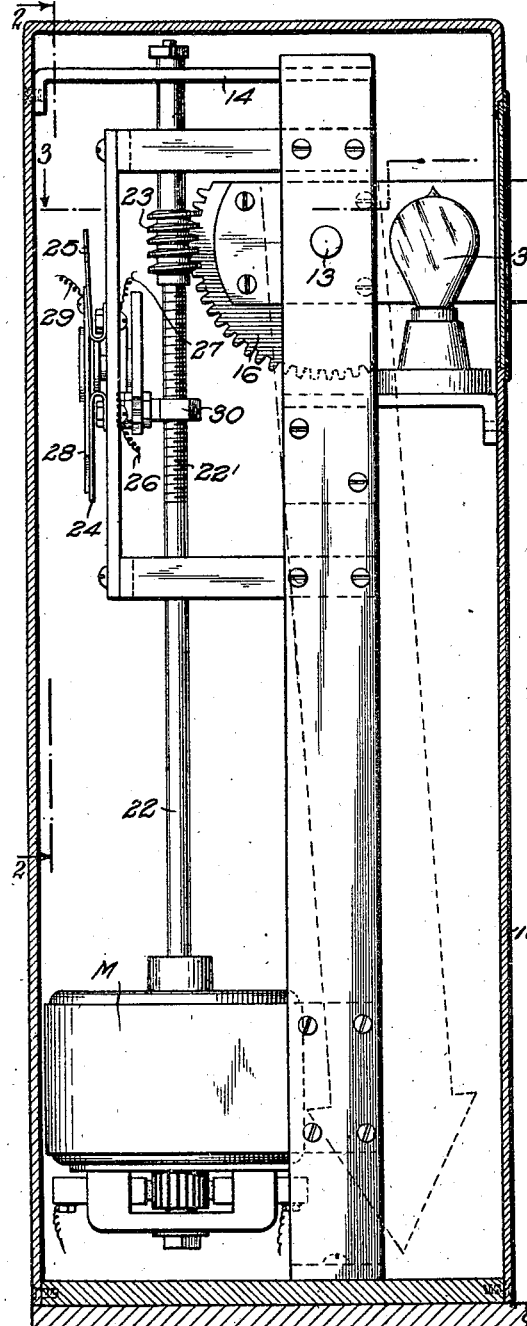
Figure 1:
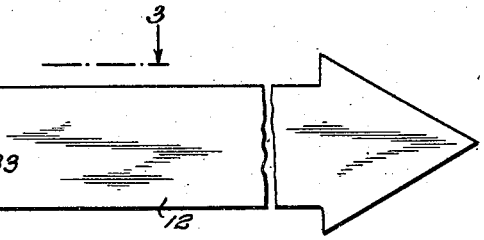

C. P. CARPENTER & J. A. BOHL.
AUTOMOBILE SIGNAL.
APPLICATION FILED JULY 16, 1915.

1,171,319.

Patented Feb. 8, 1916.
2 SHEETS—SHEET 1.

WITNESSES
L. Hauerstein
Geo. L. Beeler

INVENTORS
C. P. Carpenter
J. A. Bohl
BY
Munn & Co.
ATTORNEYS

C. P. CARPENTER & J. A. BOHL.
AUTOMOBILE SIGNAL.
APPLICATION FILED JULY 16, 1915.

1,171,319.

Patented Feb. 8, 1916.
2 SHEETS—SHEET 2.

WITNESSES
L. Hauerstein
Geo. L. Beeler

INVENTORS
C. P. Carpenter
J. A. Bohl
BY Munn & Co
ATTORNEYS

UNITED STATES PATENT OFFICE.

CARROLL P. CARPENTER AND JOSEPH A. BOHL, OF PLAINFIELD, NEW JERSEY.

AUTOMOBILE-SIGNAL.

1,171,319.  Specification of Letters Patent.  Patented Feb. 8, 1916.

Application filed July 16, 1915. Serial No. 40,207.

*To all whom it may concern:*

Be it known that we, CARROLL P. CARPENTER and JOSEPH A. BOHL, citizens of the United States, and residents of Plainfield, in the county of Union and State of New Jersey, have invented a new and Improved Automobile-Signal, of which the following is a full, clear, and exact description.

This invention relates to signaling devices and is especially adapted for use as a rear end signal for automobiles or like vehicles.

Among the objects of the invention is to provide a device of a practically automatic operation, the same intending to indicate to persons in the rear of or following an automobile so equipped that the automobile is about to make a turn to the right or to the left. In other words, we provide a means under the control of the driver or any other occupant of the automobile whereby he may give the proper indication with no other attention to the mechanism than to push a button or move a switch.

More definitely stated, one of the immediate objects is to provide a signal arm normally housed within a casing out of view but adapted to swing outwardly and upwardly to indicate the direction in which the machine is to be turned, the movement of the signal arm being effected positively in both directions by a reversible electric motor with worm and worm gear connections between the motor and the arm and adapted to be started by completing a circuit at a switch within reach of the occupant of the vehicle and automatically stopped when the arm reaches the limit of its movement in either direction.

A further object of the invention is to provide a lamp in or adjacent the casing aforesaid which is caused to glow automatically when the arm is in elevated position, the energy for the lamp being provided through the same source as the power for the motor.

With the foregoing and other objects in view the invention consists in the arrangement and combination of parts hereinafter described and claimed, and while the invention is not restricted to the exact details of construction disclosed herein, still for the purpose of illustrating a practical embodiment thereof reference is had to the accompanying drawings, in which like reference characters designate the same parts in the several views, and in which—

Figure 2:
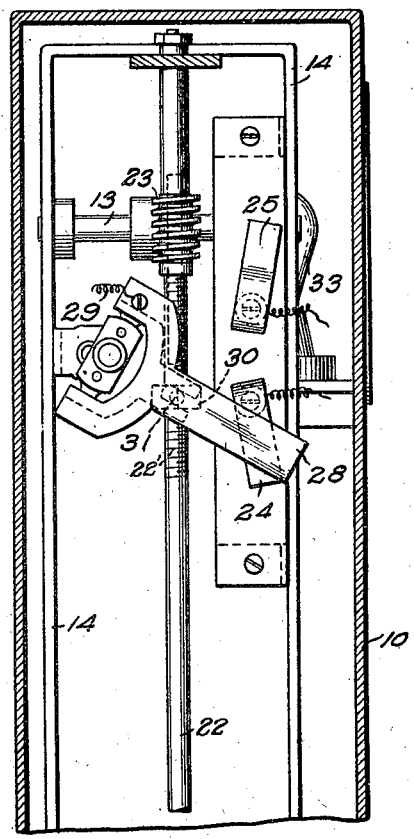
Figure 3:
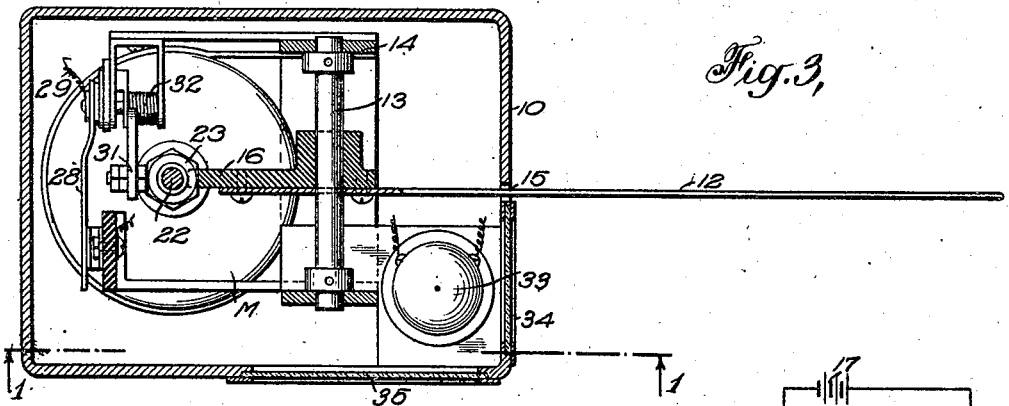
Figure 4:
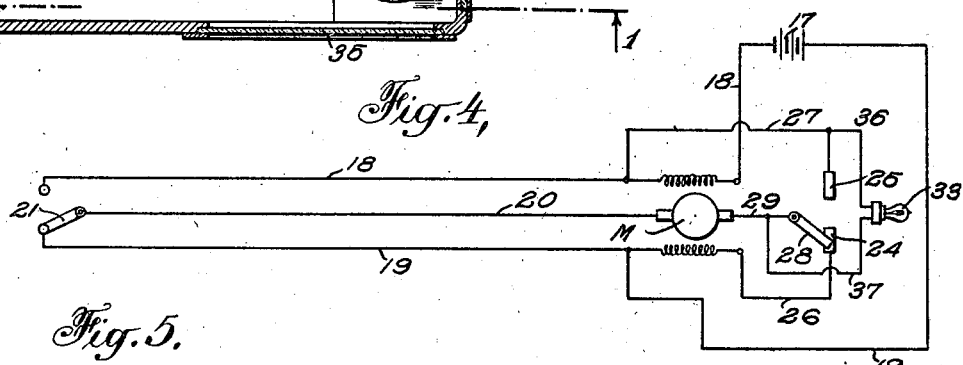
Figure 5:
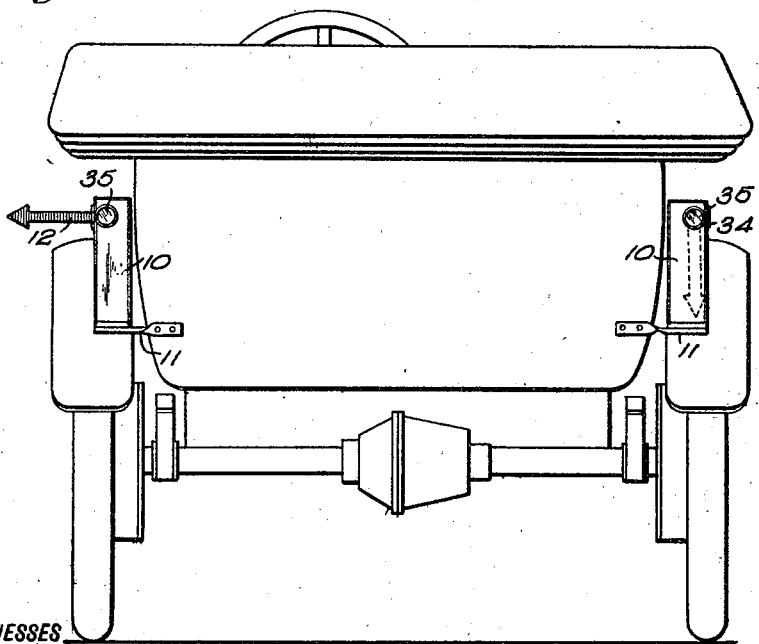

Figure 1 is a rear elevation of our improvement as adapted for the rear right hand corner of the vehicle, the casing being in section on the line 1—1 of Fig. 3; Fig. 2 is a vertical section on the line 2—2 of Fig. 1; Fig. 3 is a transverse section on the line 3—3 of Fig. 1; Fig. 4 is a diagram of the wiring for the motor and lamp; and Fig. 5 is an elevation of the rear end of an automobile equipped with our improvement.

Referring more particularly to the drawings we show at 10 a casing secured at any convenient place adjacent one of the rear corners of the vehicle as upon a bracket 11 carried by the body of the machine or mudguard, a similar device being provided on the opposite corner. While the casings are indicated in Fig. 5 as being rights and lefts, they otherwise are identical, and a specific description of one will be understood as applicable to both.

The numeral 12 indicates a signal arm mounted to swing outwardly and upwardly in a vertical plane around a horizontal axis 13. The axis or pivot 13 is supported upon a vertical frame 14 within and near the top of the casing, and when it swings outwardly passes through a vertical slot 15 in the outer side of the casing with respect to the center of the vehicle. The worm gear or a segment of a worm gear 16 is secured to the inner end of the arm and concentric with the axis of the same.

At M is indicated a motor in circuit with a battery 17 carried at any suitable place. The battery is connected to the motor by means of wires 18, 19 on the opposite sides of the battery, and a wire 20 adapted to be connected with either of the wires aforesaid through a movable switch 21 within reach of the driver or any other occupant of the vehicle. A motor shaft 22 is journaled in the frame 14 and carries a worm 23 meshing constantly with the gear 16.

At 24 and 25 are indicated a pair of contact springs connected by wires 26 and 27 respectively to the opposite sides of the motor or wires 19, 18 respectively, and between which springs a switch blade 28 is adapted to move, said blade being connected to the motor by means of a wire 29.

The motor 22 is threaded at 22' upon which is mounted a follower 30. When the motor shaft is rotated by the motor far enough to positively move the arm 12 in either direction by direct action, the screw thread 22' will move the follower up or down to a certain distance according to the nature of the thread. The follower 30 is connected by pin and slot connection at 31 to the movable or automatic switch blade 28 and thereby when the follower is moved by the motor shaft to the desired distance it will positively cause sufficient movement of the automatic blade 28 in the same direction to permit a spring 32 carried thereby to snap said blade from one of the springs 24 or 25 to the other, and thereby the circuit will be broken through the motor and the motor will accordingly stop. It will be noted at this point that the worm 23 being in constant mesh with the gear 16 will always constitute a positive lock for holding the arm in whatever position it may be when the motor stops.

The operation of the device as thus far described may be briefly set forth as follows: Assuming the parts to be in the position indicated in Fig. 4 which corresponds to Fig. 1 with the signal arm in indicating position and with the motor stopped, in order to cause the arm 12 to be lowered within the casing, the operator will move the switch 21 to connect the wires 18 and 20. The current will then be from the battery through the wire 18, switch 21, wire 20, motor, wire 29, automatic switch 28, and wires 26 and 19. The motor then will run until its shaft makes a sufficient number of rotations to carry the follower 30 upwardly until the automatic switch 28 is caused to snap from the spring 24, thereby breaking the circuit and stopping the motor. At this time the arm will have been withdrawn into the casing. The movement of the automatic blade 28 will, however, be continued by the action of its spring 32 until it engages and rests upon the spring 25. The operator, therefore, is relieved from any obligation to move his switch for the purpose of stopping the motor. When the arm 12 is carried within the casing in normal position, the switch 21 will connect with the wire 18, and the automatic switch 28 will lie upon the spring 25. In order to set the signal arm in its indicated position, the operator then will move the switch to the position indicated in Fig. 4 while the automatic switch lies in normal position, when the energy from the battery will be through the wires 18 and 27, spring 25, automatic switch 28, wire 29, through the motor, wire 20, switch 21, and wire 19.

At 33 is indicated a lamp carried preferably within the casing and adapted to glow through a window 34 upon the signal arm when elevated, and also, if desired, through a rear window 35. Any suitable wiring may be provided to cause the lamp to glow when required, preferably only at the time the arm is up. To this end we provide a lamp circuit comprising wires 36 and 37 connected respectively to the main wires 27 and 29 respectively. As indicated in Fig. 4, the parts are so arranged that the lamp will glow, the power therefor being furnished from the battery through wires 18, 27, 36, 37 and 29, switch 28, and wires 26 and 19. If, however, the switch blade 28 is in its opposite position, the lamp will not glow because of the short circuit between the wires 27 and 29 through the switch blade 28.

We claim:—

1. In a signal for automobiles or the like, the combination of a casing, a signal arm mounted within the casing on a horizontal pivot and movable laterally and upwardly from the casing into display position, a segmental worm gear secured to the arm concentrically with said pivot, a power shaft journaled in the casing in substantially the same plane as the gear, a worm carried by the shaft meshing directly with the gear and serving to control all of its movements, said shaft having a screw threaded portion adjacent one end of the worm, means to rotate the shaft positively in either direction, a follower mounted upon the threaded portion of the shaft and movable toward or from the worm according to the direction of rotation of the shaft, and means to automatically control the aforesaid means for driving the shaft, the last mentioned means including an arm having pin and slot connection with said follower.

2. In a signal for automobiles or like vehicles, the combination of a casing, an arm mounted within the casing and movable around a horizontal axis outwardly therefrom into straight position, a segmental worm gear connected to the arm and arranged concentrically with respect to the axis of the pivot, a reversible motor having its shaft lying adjacent the gear and in the same plane thereof, a worm carried by the shaft and meshing constantly with the gear to control all of the movements of the arm, the shaft adjacent one end of the worm being screw threaded, a follower mounted upon the threaded portion of the shaft and movable thereby toward or from the worm according to the direction of rotation of the motor, a source of electrical energy for the motor, main wires between the source of energy and the motor, an auxiliary wire adapted to be brought into connection with either of the other wires by hand operation to initiate the operation of the motor, a pair of spaced contacts, a switch blade having pin and slot connection with the follower and movable from one of said contacts to the other, a spring to cause said blade to snap from one contact to the other during such movement to automatically stop the motor when it has caused the arm to be moved into either its housed or its display position, and a lamp circuit and lamp associated with the aforesaid main circuit and caused to glow when the signal arm is in display position.

CARROLL P. CARPENTER.
JOSEPH A. BOHL.

Witnesses:
WILLIAM A. WOODRUFF,
AGNES JEAGER.